US009462869B2

(12) United States Patent
Bitoh

(10) Patent No.: US 9,462,869 B2
(45) Date of Patent: Oct. 11, 2016

(54) DRAWING APPARATUS AND CONTROL METHOD OF DRAWING APPARATUS

(71) Applicant: CASIO COMPUTER CO., LTD., Tokyo (JP)

(72) Inventor: Hiroyasu Bitoh, Ome (JP)

(73) Assignee: CASIO COMPUTER CO., LTD, Tokyo (JP)

(*) Notice: Subject to any disclaimer, the term of this patent is extended or adjusted under 35 U.S.C. 154(b) by 0 days.

(21) Appl. No.: 14/745,928

(22) Filed: Jun. 22, 2015

(65) Prior Publication Data

US 2015/0374092 A1 Dec. 31, 2015

(30) Foreign Application Priority Data

Jun. 30, 2014 (JP) ................................ 2014-133608

(51) Int. Cl.

*G06K 15/22* (2006.01)
*A45D 29/00* (2006.01)
*B41J 3/407* (2006.01)

(52) U.S. Cl.

CPC ......... *A45D 29/00* (2013.01); *A45D 2029/005* (2013.01); *B41J 3/407* (2013.01)

(58) Field of Classification Search

None
See application file for complete search history.

(56) References Cited

U.S. PATENT DOCUMENTS

| | | | | |
|---|---|---|---|---|
| 4,754,288 A * | 6/1988 | Lawrence | B43L 13/024 | 346/139 R |
| 4,933,876 A * | 6/1990 | Markoff | G01D 15/16 | 346/139 R |
| 4,970,662 A * | 11/1990 | Tanaka | G01D 15/28 | 346/139 R |
| 5,931,166 A * | 8/1999 | Weber | A45D 34/04 | 132/200 |
| 6,286,517 B1 * | 9/2001 | Weber | A45D 29/00 | 132/200 |
| 6,336,694 B1 * | 1/2002 | Ishizaka | A45D 29/00 | 347/105 |
| 8,814,291 B2 * | 8/2014 | Bitoh | A45D 29/00 | 347/101 |
| 9,139,021 B2 * | 9/2015 | Nakajima | B41J 3/4073 | |
| 9,357,825 B2 * | 6/2016 | Yamasaki | A45D 29/00 | |
| 2011/0070013 A1 * | 3/2011 | Shamitoff | B43K 5/005 | 401/108 |
| 2013/0247929 A1 * | 9/2013 | Namai | A45D 29/00 | 132/200 |
| 2015/0077770 A1 * | 3/2015 | Hepworth | A45D 29/00 | 358/1.6 |
| 2016/0052295 A1 * | 2/2016 | Legallais | B41J 29/38 | 358/1.8 |

FOREIGN PATENT DOCUMENTS

| | | |
|---|---|---|
| JP | H05-221195 A | 8/1993 |
| JP | H07-290895 A | 11/1995 |

* cited by examiner

*Primary Examiner* — Ted Barnes

(74) *Attorney, Agent, or Firm* — Scully, Scott, Murphy & Presser, PC

(57) ABSTRACT

A drawing apparatus to perform drawing on a drawing target surface which is a surface of a fingernail or toenail having a curved shape includes a drawing tool holder which holds a drawing tool in such a way that the drawing tool is movable toward and away from the drawing target surface; and a drawing tool pressing mechanism which presses the drawing tool with a pressing force toward the drawing target surface when the drawing tool performs drawing. The drawing tool pressing mechanism changes the pressing force in accordance with a change in height of a position to be touched by the drawing tool on the drawing target surface according to the curved shape due to a change in position where the drawing tool touches the drawing target surface, to reduce a change in pressure on the drawing target surface from the drawing tool.

15 Claims, 9 Drawing Sheets

DRAWING APPARATUS AND CONTROL METHOD OF DRAWING APPARATUS

CROSS-REFERENCE TO RELATED APPLICATIONS

This application is based upon and claims the benefit of priority from the prior Japanese Patent Application No. 2014-133608, filed on Jun. 30, 2014, the entire contents of which are incorporated herein by reference.

BACKGROUND OF THE INVENTION

1. Field of the Invention

The present invention relates to a drawing apparatus and a control method for drawing with a drawing apparatus.

2. Description of the Related Art

Plotter drawing apparatuses for perform drawing on paper have been known. Among such drawing apparatuses there has been a drawing apparatus that adjusts current to be supplied to a current variable solenoid so as to change a pen pressure of a drawing tool, such as a pen. Such a drawing apparatus is disclosed in, for example, Japanese. Unexamined Patent Application Publication No. 7-290895.

A plotter drawing apparatus is also known including both a drive source to move a drawing tool up and down and a drive source to adjust a pen pressure. Such a drawing apparatus is disclosed in, for example, Japanese Unexamined Patent Application Publication No. 5-221195.

In recent years, studies have been done to apply a plotter drawing apparatus to a drawing apparatus for drawing nail designs on fingernails, for example. Paper, which is a drawing target of conventional plotter drawing apparatuses, has a flat surface; whereas a nail, which is a drawing target of drawing apparatuses for drawing nail designs, has a curved surface. Accordingly, when a plotter drawing apparatus is applied to a drawing apparatus for drawing nail designs on nails, a drawing tool, such as a pen, has to be moved up and down largely in accordance with the curved shape of nails. For the current variable solenoid mentioned above, an up-and-down motion by about 2 mm is assumed. A drawing apparatus for drawing nail designs on nails, on the other hand, should move a drawing tool up and down by a distance of, for example, 5 to 10 mm and usually cannot move the drawing tool larger than that. When a plotter drawing apparatus includes a plurality of drive sources, i.e., a drive source for the up-and-down motion and a drive source for adjusting pen pressure, the apparatus inevitably has a large size.

BRIEF SUMMARY OF THE INVENTION

The present invention advantageously provides a drawing apparatus and a control method for drawing with a drawing apparatus that can move a drawing tool up and down in accordance with the height of a drawing target surface even if the height of the drawing target surface varies largely, and that can perform drawing on the drawing target surface while applying an appropriate pen pressure to the drawing target surface.

According to a first aspect of the present invention, there is provided a drawing apparatus including: a drawing tool holder which holds a drawing tool in such a way that the drawing tool is movable toward a drawing target surface and away from the drawing target surface, the drawing tool touching the drawing target surface to perform drawing on the drawing target surface, wherein the drawing target surface is a surface of a nail of a finger or toe, where the surface of the nail has a curved shape along one direction; and a drawing tool pressing mechanism which presses the drawing tool, held by the drawing tool holder, with a pressing force toward the drawing target surface when the drawing tool performs the drawing on the drawing target surface, wherein the drawing tool pressing mechanism changes the pressing force in accordance with a change in height of a position to be touched by the drawing tool on the drawing target surface according to the curved shape due to a change in position where the drawing tool touches the drawing target surface, in such a way as to reduce a change in pressure which the drawing tool applies to the drawing target surface by touching the drawing target surface.

According to a second aspect of the present invention, there is provided a control method of a drawing apparatus including a drawing tool holder which holds a drawing tool in such a way that the drawing tool is movable toward a drawing target surface and away from the drawing target surface, the drawing tool touching the drawing target surface to perform drawing on the drawing target surface, wherein the drawing target surface is a surface of a nail of a finger or toe, where the surface of the nail has a curved shape along one direction and a drawing tool pressing mechanism which presses the drawing tool, held by the drawing tool holder, with a pressing force toward the drawing target surface when the drawing tool performs the drawing on the drawing target surface, the method including the steps of: pressing, using the drawing tool pressing mechanism, the drawing tool held by the drawing tool holder toward the drawing target surface when the drawing tool performs the drawing on the drawing target surface; and changing, using the drawing tool pressing mechanism, the pressing force in accordance with a change in height of a position to be touched by the drawing tool on the drawing target surface according to the curved shape due to a change in position where the drawing tool touches the drawing target surface, in such a way as to reduce a change in pressure which the drawing tool applies to the drawing target surface by touching the drawing target surface.

BRIEF DESCRIPTION OF THE SEVERAL VIEWS OF THE DRAWING

FIG. 6A is a side view showing a state in which the sliding pin is not pressed, and FIG. 6B is a side view showing a state in which the sliding pin is pressed;

DETAILED DESCRIPTION OF THE INVENTION

Figure 1:
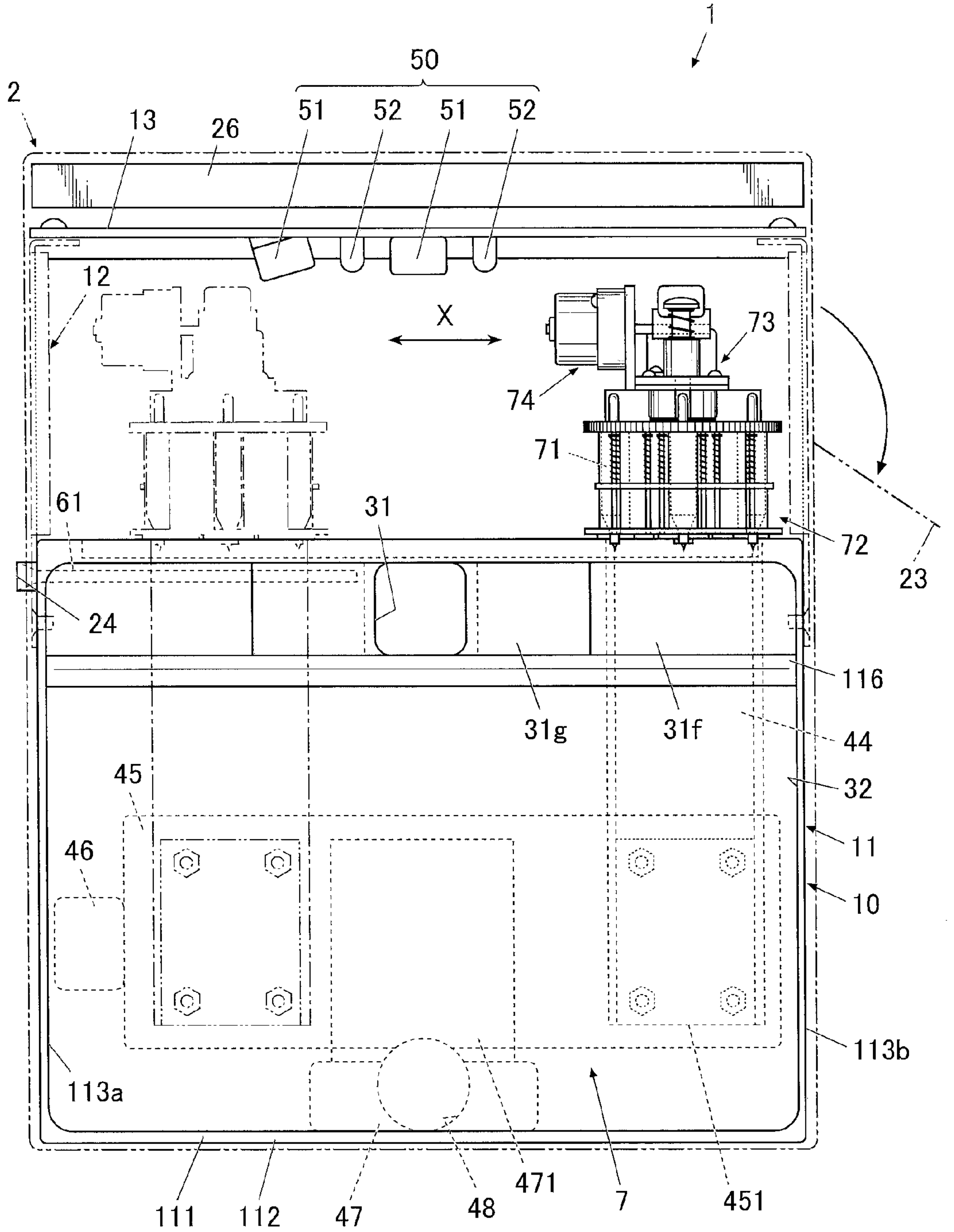
FIG. 1 is a front view of a nail printing apparatus in this embodiment.

An embodiment of a drawing apparatus according to the present invention will now be described in detail with reference to the drawings. The scope of the present invention, however, is not limited to the examples shown in the drawings.

The nail printing apparatus 1 of the embodiment performs drawing on the nail surface of a finger as a drawing target surface. The drawing target surface of the present invention, however, is not limited to the nail surface of a finger. For example, the nail surface of a toe may be the drawing target surface.

FIG. 1 shows the internal configuration of the nail printing apparatus 1.

Figure 2:
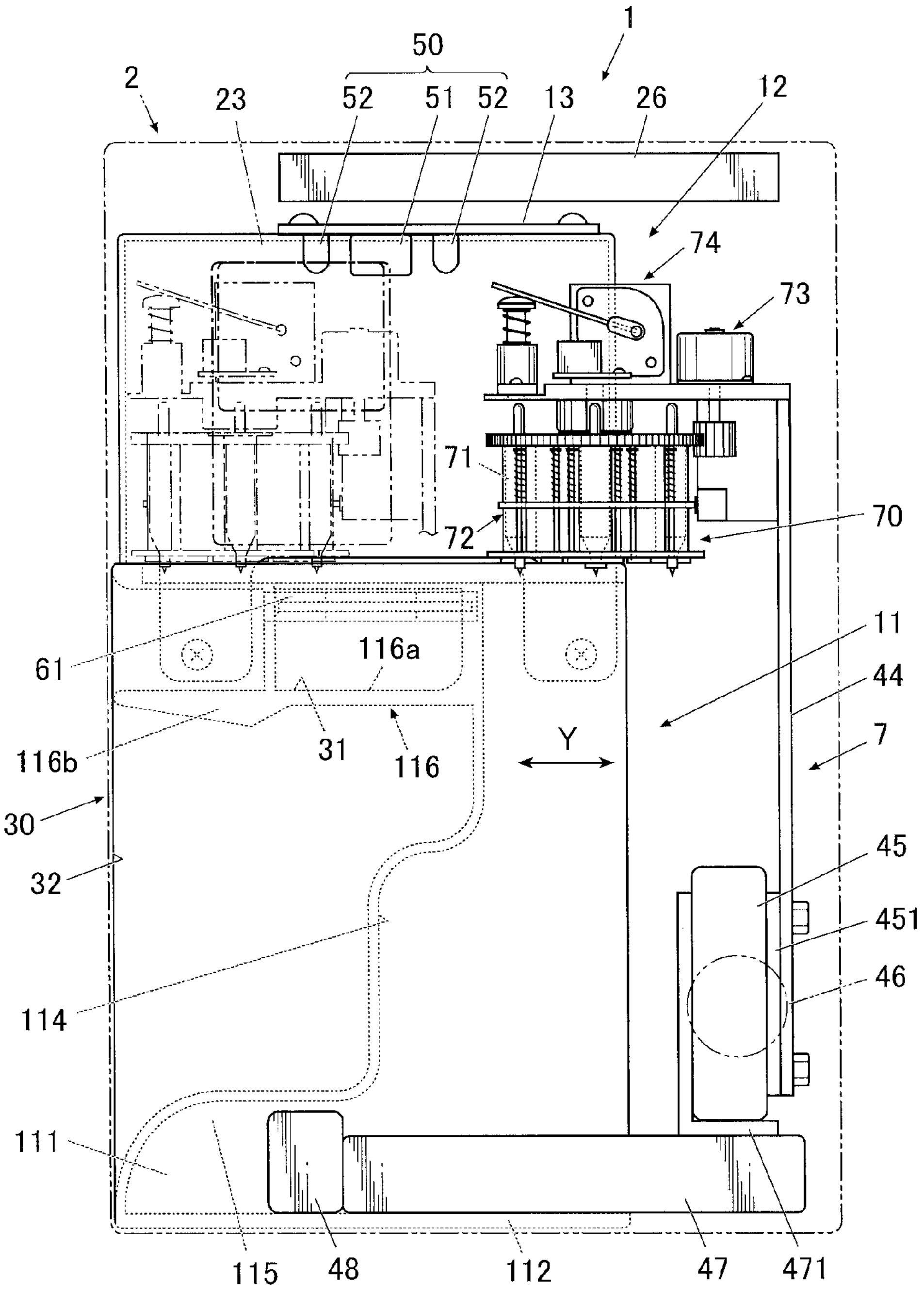
FIG. 2 is a sectional side view of the nail printing apparatus of FIG. 1, a part of which is shown in section to describe the internal configuration.

FIG. 2 is a sectional side view of the nail printing apparatus of FIG. 1, a part of which is shown in section to describe the internal configuration.

As shown in FIGS. 1 and 2, the nail printing apparatus (drawing apparatus) 1 of this embodiment is a plotter printing apparatus including a drawing head 70 with pens 71 to perform drawing on the nails T of printing fingers U1.

The nail printing apparatus 1 includes a case body 2 and an apparatus body 10 contained in the case body 2.

A cover 23 for pen replacement is disposed at one end of the upper part of the lateral face of the case body 2. The cover 23 can be opened and closed so that a pen (drawing tool) 71 of a drawing unit 7, described later, can be replaced. The cover 23 for pen replacement can turn about a hinge, for example, from a closing state to an opening state as shown in FIG. 1.

One lateral face (the left face in FIG. 1 in this embodiment) of the case body 2 has a medium insertion/output opening 24 at the position corresponding to a pen warm-up section 61, which is described later. A drawing medium (not shown) placed on the pen warm-up section 61 can be replaced through the medium insertion/output opening 24.

An operation unit 25 (see FIG. 9) is disposed on the upper surface (top board) of the case body 2.

The operation unit 25 is an input unit to receive various inputs from a user.

The operation unit 25 includes operation buttons (not shown) for various inputs, such as an electrical power switch button to power on the nail printing apparatus 1, a stop switch button to stop its operation, a design selection button to select a design image to be drawn on nails T, and a drawing start button to instruct start of drawing.

A display unit 26 is disposed on the upper surface (top board), almost in its center, of the case body 2.

The display unit 26 is constituted of a liquid crystal display (LCD), an organic electroluminescence display (organic EL), or another flat-panel display.

In the present embodiment, the display unit 26 displays finger images obtained by photographing a printing finger U1 (i.e., images each including the image of a nail T), the image of the outline of the nail T included in the finger images, a design selection screen for selection of a design image to be drawn on a nail T, a thumbnail image for check of a design, an instruction screen to provide various instructions, and the like, as appropriate.

A touch panel may be integrally formed on the surface of the display unit 26. In this case, information can be input through touch operations of the surface of the display unit 26 with a fingertip, a stylus pen, or other stick writing implements having a sharp end to be pressed against the panel surface (not shown).

The apparatus body 10, which is substantially formed in the shape of a box, includes a lower machine casing 11 disposed at the lower part in the case body 2, and an upper machine casing 12 disposed above the lower machine casing 11 and at the upper part in the case body 2.

The lower machine casing 11 will now be described.

The lower machine casing 11 includes a back plate 111, a bottom plate 112, a pair of side plates 113*a* and 113*b*, an X-direction movement stage storage part 114, a Y-direction movement stage storage part 115, and a dividing wall 116.

The lower ends of the side plates 113*a* and 113*b* are connected to the both ends of the bottom plate 112, respectively, so that the side plates 113*a* and 113*b* are upright with respect to the bottom plate 112.

The lower part of the back plate 111 is caved in in two steps toward the front (i.e., near side in the finger insertion direction) to form recesses. The back plate 111, the bottom end of which is connected to the front end of the bottom plate 112, partitions the space enclosed by the bottom plate 112 and the side plates 113*a* and 113*b* into a front space and a back space.

The recessed spaces formed at the back of the back plate 111 are the X-direction movement stage storage part 114 and the Y-direction movement stage storage part 115 (see FIG. 2). An X-direction movement stage 45 of a drawing unit 7 fits in the X-direction movement stage storage part 114 when the drawing unit 7 moves forward (i.e., to the near side in the finger insertion direction).

A Y-direction movement stage 47 of the drawing unit 7 is disposed in the Y-direction movement stage storage part 115.

The dividing wall 116 is disposed in the lower machine casing 11 so as to vertically partition the front space inside the lower machine casing 11 (i.e., the space on the near side in the finger insertion direction enclosed by the back plate 111, the bottom plate 112 and the side plates 113*a* and 113*b*). The dividing wall 116 lies substantially horizontally so that the left and right ends of the dividing wall 116 are connected to the side plates 113*a* and 113*b*, respectively, and so that the rear end of the dividing wall 116 is connected to the back plate 111.

The lower machine casing 11 is provided with a finger fixation section 30 integrally (see FIG. 2).

The finger fixation section 30 is constituted of a finger receiving section 31 and a finger escape section 32. The finger receiving section 31 is a section to receive a finger U1 with a nail T on which drawing is to be performed ("printing finger U1", hereinbelow), and the finger escape section 32 is a section where fingers U2 other than the printing finger U1 ("non-printing fingers U2", hereinbelow) are inserted.

The finger receiving section 31 is disposed over the dividing wall 116 and almost at the center of the lower machine casing 11 in the width direction.

The lower space, formed by the dividing wall 116, of the lower machine casing 11 constitutes the finger escape section 32.

Figure 8:
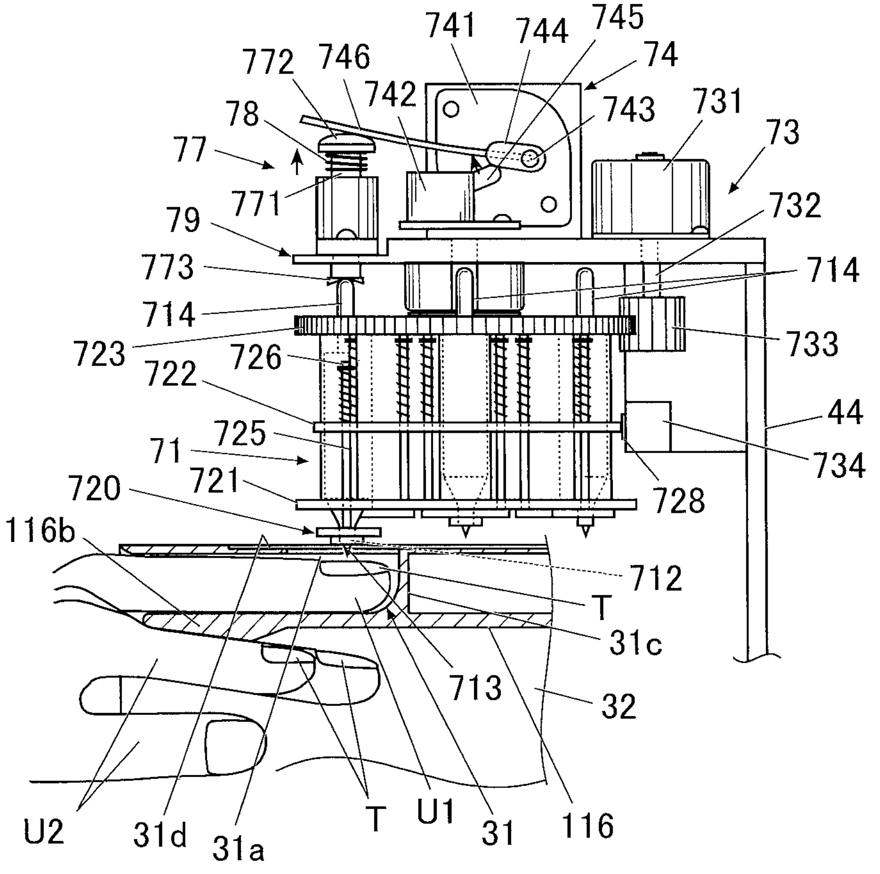
FIG. 8 is a side view the pen carriage and pens held by the pen carriage in a drawing state in which a finger is placed in a finger fixation section.

For example, when a drawing is to be made on the nail T of a ring finger as shown in FIG. 8, the ring finger as a printing finger U1 is inserted in the finger receiving section 31, while the other four fingers (i.e., the thumb and index, middle, and little fingers) as non-printing fingers U2 are inserted in the finger escape section 32.

The finger receiving section 31 opens toward the front side (i.e., near side in the printing finger insertion direction) of the lower machine casing 11 and is defined by a finger placement section 116*a* at the bottom which constitutes a part of the dividing wall 116, partitions 31*a* at the both sides, and a partition 31*c* at the back (see FIG. 8). The finger placement section 116*a* allows a finger (printing finger U1) with a drawing target nail T to be placed on an X-Y plane.

The finger receiving section 31 is defined by a ceiling 31*d* at the top. The ceiling 31*d* has a window 31*e* through which the nail T of a printing finger U1 inserted in the finger receiving section 31 is exposed (see FIG. 8).

A front wall 31*f* which covers the front both-side parts of the lower machine casing 11 stands upright on the upper surface of the dividing wall 116 (see FIG. 1).

A pair of guide walls 31*g* (see FIG. 1) to guide a printing finger U1 into the finger receiving section 31 stands upright on the upper surface of the dividing wall 116. The guide walls 31*g* narrow from the end near the center of the front wall 31*f* toward the finger receiving section 31.

The dividing wall 116 can be held between a printing finger U1 inserted in the finger receiving section 31 and non-printing fingers U2 inserted in the finger escape section 32 by a user. Thus, a printing finger U1 inserted in the finger receiving section 31 can be stably fixed.

In this embodiment, the dividing wall 116 is provided with a bulge 116*b* bulging downward at the front end portion of the dividing wall 116. The bulge 116*b* may form a taper portion whose thickness gradually decreases toward the near side and gradually increases toward the back. Alternatively, the entire thickness of the bulge 116*b* may be larger than that of the back part of the dividing wall 116. Providing the bulge 116*b* at the front end portion of the dividing wall 116 creates an interspace between nails T of non-printing fingers U2 and the dividing wall 116 when the non-printing fingers U2 after drawing are inserted in the finger escape section 32, as shown in FIG. 8. This can prevent the nails T from coming into contact with the bottom surface of the dividing wall 116 and thus prevent ink from adhering to the apparatus. The designs drawn on the nails T are also prevented from being rubbed or spoiled.

A pen warm-up section 61 for warm-up of a pen 71 (described later) is provided on the upper surface of the lower machine casing 11 beside the finger receiving section 31 (i.e., at the position corresponding to the medium insertion/output opening 24 of the case body 2, which is on the left side in FIG. 1 in this embodiment). The pen warm-up section 61 is provided within the region over which the drawing head 70 (described later) can perform drawing. Preferably, a part of the upper surface of the lower machine casing 11 is recessed to form the pen warm-up section 61, and the pen warm-up section 61 is substantially the same height as the nail T of a printing finger U1 inserted in the finger receiving section 31.

The pen warm-up section 61 is a flat part on which a drawing medium (not shown) inserted through the medium insertion/output opening 24 of the case body 2 is placed.

Anything that enables warm-up (breaking-in or conditioning) of the pen tips 713 may be used as a drawing medium to be placed on the pen warm-up section 61. For example, a slip of paper may be used.

The pen warm-up section 61 is used for warm-up drawing to bring a pen tip 713 in good condition before the start of image drawing based on image data on a nail T. Specifically, in the warm-up drawing, a pen 71 is carried down to a drawing medium to draw predetermined figures, such as "○" and "∞". This prevents fuzzy lines at the beginning of the drawing due to drying of the pen tip 713 or a bad spread of ink.

The predetermined figure to be drawn for the warm-up drawing is not particularly limited, but preferably is a simple figure such as "○" and "∞" for the entire circumference of the pen tip 713 to be used and not to waste ink. The figure, such as "○" and "∞", is preferably drawn at a position shifted a little each time of the warm-up drawing within the range of the pen warm-up section 61.

When almost the entire drawing medium is filled with the drawn figures, the display unit 26 displays on the screen a message demanding replacement of a drawing medium, such as "replace paper". A user then takes the drawing medium out through the medium insertion/output opening 24 to replace it with a new one to allow warm-up drawing on the new drawing medium. The drawing medium may be a roll of paper, for example. In this case, when there is no more space for drawing, the drawing medium of the roll paper is pulled out and warm-up drawing can be made on a new surface.

The drawing unit 7 includes the drawing head 70 having pens 71 for drawing, a unit support member 44 to support the drawing head 70, the X-direction movement stage 45 to move the drawing head 70 in the X direction (i.e., the X direction in FIG. 1 or the right-left direction of the nail printing apparatus 1), an X-direction movement motor 46, the Y-direction movement stage 47 to move the drawing head 70 in the Y direction (i.e., the Y direction in FIG. 2 or the front-back direction of the nail printing apparatus 1), and a Y-direction movement motor 48.

Figure 3A:
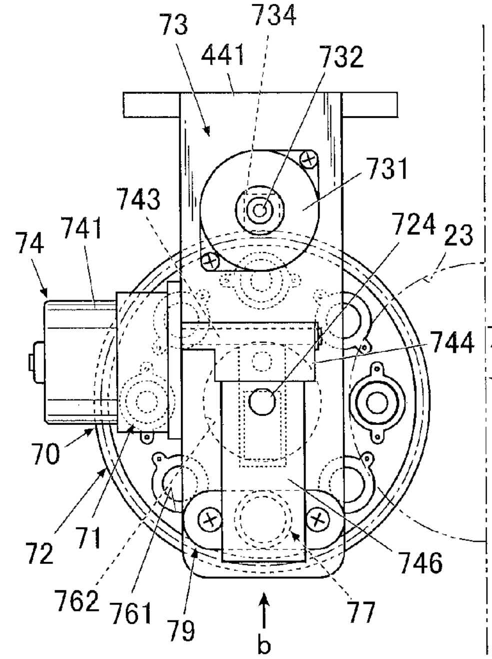
FIG. 3A is a top view of a drawing head in the this embodiment.

FIG. 3A is a top view of the drawing head 70.

Figure 3C:
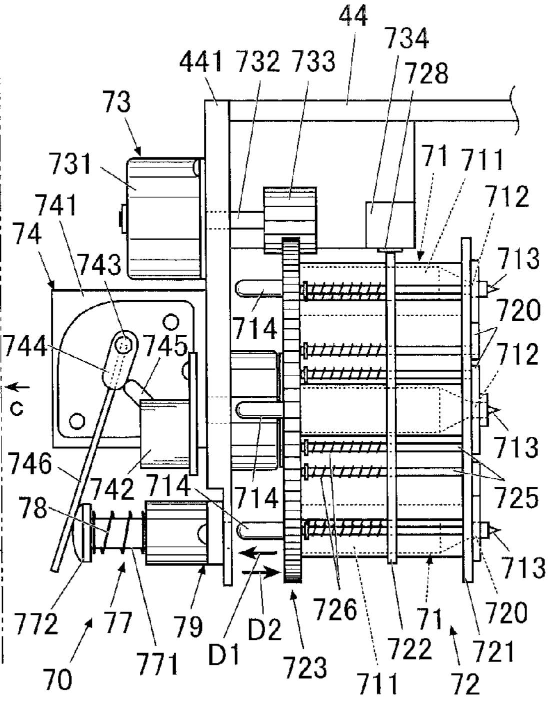
FIG. 3C is a side view of the drawing head, seen from the direction of arrow c of FIG. 3A.
Figure 3B:
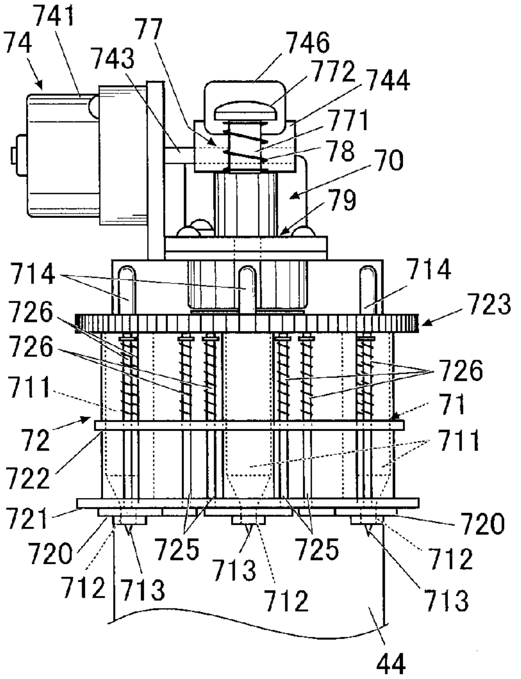
FIG. 3B is a front view of the drawing head, seen from the direction of arrow b of FIG. 3A.

FIG. 3B is a front view of the drawing head 70, seen from the direction of arrow b of FIG. 3A.

FIG. 3C is a side view of the drawing head 70, seen from the direction of arrow c of FIG. 3A.

As shown in FIGS. 3A to 3C, the drawing head 70 of this embodiment includes a rotary pen carriage (drawing tool holder) 72 that can hold a plurality of pens 71, a carriage rotation mechanism 73 to rotate the pen carriage 72, and a pen pressing mechanism (drawing tool pressing mechanism) 74 to carry a pen 71 held by the pen carriage 72 upward D1 and downward D2.

The upper end of the unit support member 44 is a beam part 441 extending toward the near side of the nail printing apparatus 1 (i.e., the left side in FIG. 2) to form an L shape. The drawing head 70 is disposed on the beam part 441.

The pen carriage 72 of this embodiment includes three disk members 721 to 723 (i.e., a first disk member 721, a second disk member 722, and a third disk member 723), pen tip fixation members 720, a rotation shaft 724, support rods 725, coil springs 726, pen cylindrical members 761, and a rotation-shaft cylindrical member 762.

The three disk members 721 to 723 (the first disk member 721, the second disk member 722, and the third disk member 723) have substantially the same size. The first disk member 721, the second disk member 722, and the third disk member 723 are disposed in this order from the bottom.

The third disk member 723 disposed at the top is provided with teeth on the outer periphery of the third disk member 723 to engage with a gear 733 of the carriage rotation mechanism 73, and serves as a gear.

A reference mark 728 to indicate a reference position for the rotation of the pen carriage 72 is provided at a predetermined position (e.g., the position corresponding to a certain pen cylindrical member 761) on the outer periphery of the second disk member 722.

The reference mark 728, which is constituted of a reflecting cloth or a reflecting sheet to be read by an optical sensor, is fixed (e.g., pasted) to the outer periphery of the second disk member 722 in this embodiment.

The pen carriage 72 has eight pen cylindrical members 761 to hold pens 71 along its periphery. The top and bottom of each pen cylindrical member 761 are open.

Figure 4A:
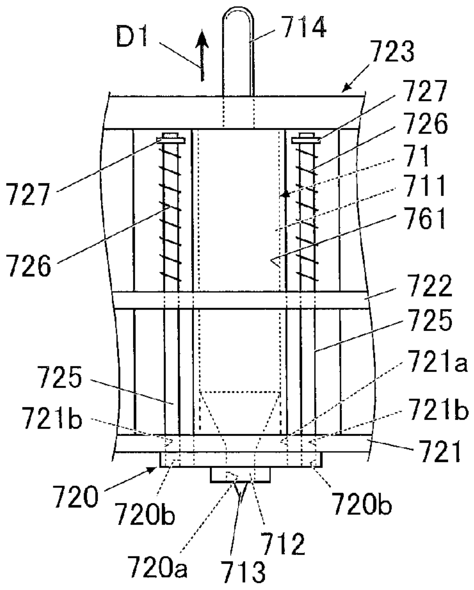
FIG. 4A is an enlarged side view of a part of a pen carriage in a non-drawing state in which a pen is in an upper position without being pressed.

FIG. 4A is a main-part side view of a part, which is enlarged, of the pen carriage 72 in a non-drawing state in which a pen 71 is in an upper position.

Figure 4B:
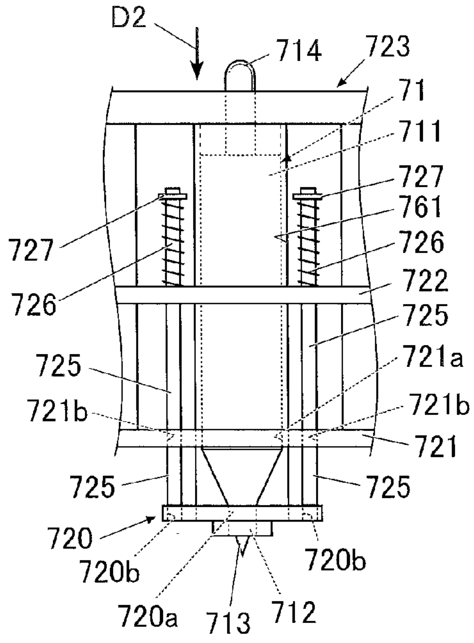
FIG. 4B is an enlarged side view of a part of the pen carriage in a drawing state in which a pen is pressed to be in a lower position.

FIG. 4B is a main-part side view showing a drawing ready state in which the pen 71 of FIG. 4A is carried down.

Figure 4C:
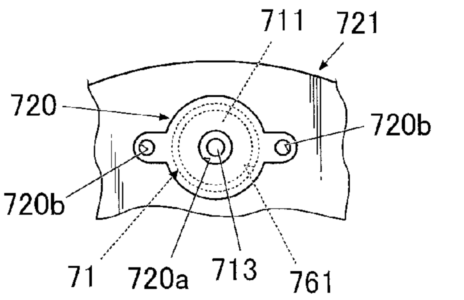
FIG. 4C is a bottom view, viewed from below, of the pen carriage of FIG. 4A.

FIG. 4C is a bottom view, viewed from below, of the pen carriage 72 of FIG. 4A.

Figure 4D:
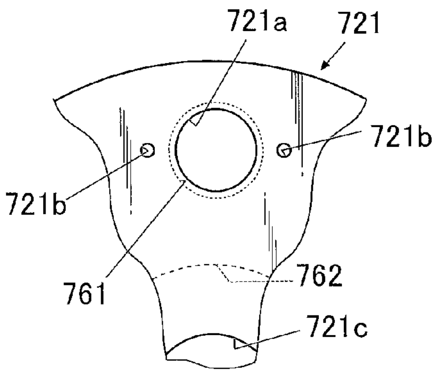
FIG. 4D is an enlarged plan view of a part of a first disk member.

FIG. 4D is an enlarged view of a part of the first disk member 721, a pen tip fixation member 720 being removed from the first disk member 721 of FIG. 4C.

In this embodiment, each of the three disk members 721 to 723 has through-holes at the positions for the pen cylindrical members 761 as shown in FIG. 4A to FIG. 4D. In FIGS. 4A, 4B, and 4D, a through-hole 721*a* is shown only for the first disk member 721. The pen cylindrical members 761 pass through the through-holes in such a way as to penetrate the three disk members 721 to 723.

The number of pen cylindrical members 761 provided on the pen carriage 72 is not particularly limited and may be more or less than eight. Increased number of pen cylindrical members 761 can hold increased number of pens 71 at one time, achieving complex nail designs with various inks.

It is not necessary that all of the pen cylindrical members 761 hold pens 71. FIGS. 3A and 3C illustrate an example in which four of the eight pen cylindrical members 761 hold pens 71.

Through-holes for support rods through which the support rods 725 pass are provided at both sides of each through-hole for pen in the first and second disk members 721 and 722. In FIGS. 4A, 4B, and 4D, a through-hole 721*b* is shown only for the first disk member 721.

The pen tip fixation members 720 are disposed under the first disk member 721 so as to cover the openings at the bottom of the pen cylindrical members 761.

The pen tip fixation members 720 are fixation members to fix the tip portions of the pen shafts 711 of pens 71 (drawing tools).

Each of the pen tip fixation members 720 is provided with support rods 725 and coil springs 726. The support rods 725 are fixed to be parallel to the pen shaft 711 of a pen 71 and move up and down together with the pen 71. The coil springs 726, which are biasing members for the support rods, bias the support rods 725 upward D1 when an external force is not applied.

Specifically, in this embodiment, each of the pen tip fixation members 720 has a through-hole 720*a* almost in its center. A fit part 712 of a pen 71, described later, is to be inserted and fits in the through-hole 720*a*. Recesses 720*b*, in which the shaft rods 725 fit, are provided on both sides of each through-hole 720*a*.

Each support rod 725 passes through the through-hole for support rod in each of the first and second disk members 721 and 722. The lower end part of each support rod 725 fits in the recess 720*b* of a pen tip fixation member 720. Thus each support rod 725 is fixed to the pen tip fixation member 720 to be parallel to the pen shaft 711 of a pen 71.

Each support rod 725 is provided with an E-ring 727 near its top end. The E-ring 727 protrudes outward.

The external diameter of the E-ring 727 is larger than the internal diameter of the through-hole for support rod in the second disk member 722 and larger than the outer shape of the coil spring 726.

The coil springs 726 are disposed between the E-rings 727 and the upper surface of the second disk member 722 beside the outer periphery of each pen 71.

The coil springs 726 bias the support rods 725 upward D1 when an external force is not applied.

In this embodiment, the coil springs 726, which are disposed beside the outer periphery of each pen 71 and serve as biasing members for support rods, are elastic members to be compressed when the pen 71 is pressed downward D2 by an external force and to have a restoring force against the external force.

One end of each coil spring 726 is in contact with the bottom surface of the E-ring 272, and the other end of the coil spring 726 is in contact with the upper surface of the second disk member 722.

In a non-drawing state, the coil springs 726 keep the pen 71 at such a position that the pen tip 713 does not touch a nail T. Specifically, as described above, the coil springs 726 bias the support rods 725 upward D1 (i.e., in the upper direction in FIGS. 4A and 4B) so that the upper end parts of the support rods 725 are in contact with the lower surface of the third disk member 723 when an external force is not applied. In this state, the pen tip 713 is disposed close to the lower surface of the first disk member 721 and does not touch a nail T even if the pen carriage moves over the finger receiving section 31.

Each of the three disk members 721 to 723 has a through-hole almost in the center. In FIG. 4D, the through-hole 721*c* is shown only for the first disk member 721. A rotation-shaft cylindrical member 762 passes through the center through-hole so as to penetrate the three disk members 721 to 723.

A rotation shaft 724, which extends vertically from the beam part 441, passes through the rotation-shaft cylindrical member 762. The pen carriage 72 is rotatable substantially horizontally about the rotation shaft 724.

The rotation shaft 724 preferably has washers disposed at the top and bottom of the pen carriage 72. Further, the rotation shaft 724 is preferably provided with, for example, an E-ring at the bottom of the rotation shaft 724 to prevent the rotation shaft 724 from slipping off. Such a structure enables the pen carriage 72 to rotate smoothly about the rotation shaft 724.

Figure 5:
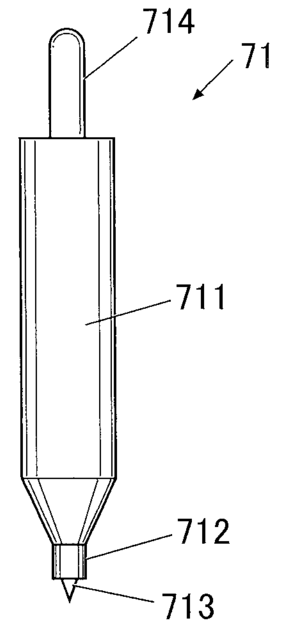
FIG. 5 is a side view of a pen.

FIG. 5 is a side view showing the appearance of a pen 71 held by a pen cylindrical member 761 shown in FIGS. 3A to 3C in this embodiment.

The pens 71 are each a drawing tool whose tip touches the surface of a nail T (i.e., drawing target surface) to perform drawing on the drawing target surface.

As shown in FIG. 5, the pen (drawing tool) 71 includes a rod-like pen shaft 711 with a pen tip 713 at its end portion (the lower end portion in FIG. 5).

In this embodiment, the pen shaft 711 has a fit part 712 at its end part. The fit part 712 has a diameter smaller than that of the pen shaft 711. The fit part 712 is a part to fit into a recess 720*b* of a pen tip fixation member 720. Fitting the fit part 712 into the recess 720*b* allows the pen tip 713 to be firmly fixed, preventing the pen tip 713 from being unsteady. The pen shaft 711 may be fixed to the fit part 712 with a screw(s) instead of being fitted to the fit part 712.

Each pen shaft 711 has a rod-like protrusion 714 at its top. The protrusion 714 is a part to be pressed by a sliding pin 77 which is described later. The protrusion 714 also serves as a tab to be pinched with fingers etc. when a user takes the pen 71 to replace it, for example.

In this embodiment, the tip of the protrusion 714 has a hemispherical shape. The tip shape of the protrusion 714, however, is not limited to the example shown in the drawing but may be any shape that allows the tip to be stably pressed and allows a user to easily pinch the tip. For example, the tip may have a spherical or flat-plate shape.

The interiors of the pen shafts 711 serve as ink containers to contain various types of inks.

Various types of inks may be applied as the ink contained in the pen shafts 711. The viscosity of ink and particle size (or particle diameter) of coloring material are not particularly limited. For example, ink containing gold and silver glitter, white ink, UV-curable ink, material for gel nails, undercoats, topcoats, and nail polish may be used as the ink.

In this embodiment, the pens 71 each have a pen tip 713 of a ballpoint-pen type, for example, which allows the ink in the pen shaft 711 to come out through the pen tip 713 pressed against the surface of a nail T for drawing.

The pens 71 are not limited to such ballpoint-type pens. The pens 71 may be fiber-type pens which allow the ink to ooze through, for example, felt pen tips for drawing, or brush-type pencils which have bundle of hair and perform drawing with the hair soaked with the ink. The pen tips 713 may have various thicknesses and shapes.

The types of the pen tips 713 of the plurality of pens 71 held by the pen carriage 72 may be the same as or different from one another.

Each pen 71 is held by the pen cylindrical member 761 of the pen carriage 72, with the pen 71 just inserted into the pen cylindrical member 761 from above. The pen 71 thus can be easily replaced by a user opening the cover 23 for pen replacement of the case body 2 and pinching the protrusion 714 with fingers or tweezers, for example.

A user thus can replace a pen 71 held by the pen carriage 72 with another pen 71 having another type of pen tip 713 and ink as appropriate depending on a nail design to be drawn, achieving a wide variety of nail designs.

As shown in FIG. 3C, the carriage rotation mechanism 73 includes a motor 731 for rotating the pen carriage 72 and a gear 733 that is connected to the motor 731 through a rotation shaft 732 and engages with the gear 723.

In this embodiment, when the motor 731 is driven to rotate the rotation shaft 732 and the gear 733 attached to the rotation shaft 732, the gear 723 engaging with the gear 733 rotates. The pen carriage 72 thus rotates rightward and leftward.

The carriage rotation mechanism 73 is provided with a mark reader 734 to read the reference mark 728 of the carriage 72. The mark reader 734 includes an optical sensor to read the reference mark 728 constituted of, for example, a reflecting cloth or a reflecting sheet. Each time the mark reader 734 reads the reference mark 728, the mark reader 734 outputs the result of the reading to the drawing controller 815.

The pen pressing mechanism 74 presses down a pen 71 or drawing tool attached to the pen carriage 72.

In this embodiment, the pen pressing mechanism 74 includes a pen up-and-down motor 741, a micro switch 742, and a plate spring (press member) 746.

The motor 741 is a step motor with a gearhead. The rotation shaft 743 of the motor 741 is provided with a fixation section 744 made of resin for fixing the plate spring 746.

The fixation section 744 encloses the base end part of the plate spring 746. This allows the fixation section 744 and the plate spring 746 to rotate with the rotation shaft 743 of the motor 741.

A lever 745 of the micro switch 742 is disposed under the fixation section 744. This allows the fixation section 744 to touch the lever 745 of the micro switch 742 to actuate the micro switch 742 in response to a downward rotation of the fixation section 744.

The plate spring 746 is an elastic member which can touch the top of the sliding pin 77 to press down the sliding pin 77 and a pen 71 in contact with the sliding pin 77, and which bends and deforms when pushed upward by the sliding pin 77 and a pen 71.

The plate spring 746 of this embodiment is a flat spring whose free end is disposed over the sliding pin 77.

The plate spring 746 has a width wide enough for the sliding pin 77 and comes into point or plane contact with the sliding pin 77.

The plate spring 746, which has a length and width enough for the sliding pin 77, is prevented from slipping from the sliding pin 77 and thus can stably press vertically down a pen 71 in contact with the sliding pin 77.

The plate spring 746 may be made of typical spring material, such as "SUS", "spring steel", "phosphor bronze", and "beryllium copper". Examples of "SUS" include "SUS301-H", "SUS304", and "SUS316".

The material for the plate spring 746 is not limited to the examples listed above.

The pressing force of the plate spring 746 relates to the degree of deformation of the plate spring 746 and the length of the plate spring 746 (i.e., the distance from the base end to the free end which acts on a pressing target). Specifically, a short plate spring 746 would provide an enough pressing force even if the plate spring 746 is made of soft material, whereas a long plate spring 746 needs to be made of hard material in order to provide an enough pressing force. The pressing force of the plate spring 746 can be adjusted based on a spring constant determined by the material and shape (e.g., length and width) of the plate spring 746. The pressing force of the plate spring 746 may be determined appropriately in accordance with, for example, the space for the plate spring 746.

Figure 6A:
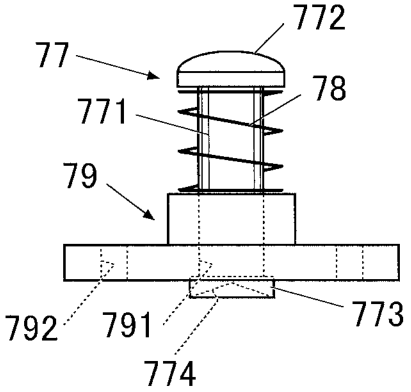
FIGS. 6A and 6B are each a side view of a sliding pin, a coil spring, and a pin attachment member, and more specifically.
Figure 6B:
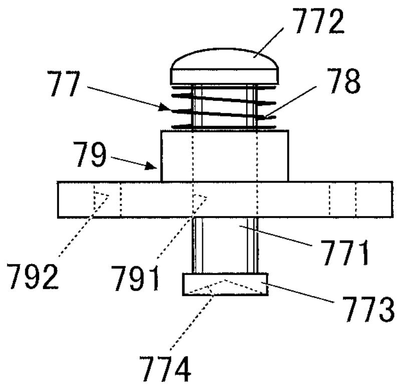

FIG. 6A shows a state in which the sliding pin 77 is in an upper position, and FIG. 6B shows a state in which the sliding pin 77 is in a lower position.

As shown in FIGS. 6A and 6B, the sliding pin 77 is movable vertically. The lower end of the sliding pin 77 touches the top of a pen 71 when the sliding pin 77 is carried down.

Specifically, the sliding pin 77 in this embodiment includes a pin shaft 771, a pin head 772 disposed on the upper end of the pin shaft 771 and having a larger diameter than the pin shaft 771 to protrude outward from the pin shaft 771, and a flange 773 disposed on the bottom end face of the pin shaft 771 and having a larger diameter than the pin shaft 771 to protrude outward from the pin shaft 771. The flange 773 has a press part 774 in its bottom end face to touch the upper part of a pen 71.

In this embodiment, the press part 774 is a conical recess to receive the protrusion 714 of a pen 71. The press part 774 may have any other shape that can stably receive the top end part of the protrusion 714, and is not limited to a recess. For example, the press part 774 may have a convex shape and the top end of the protrusion 714 may have a concave shape to receive the convex.

The coil spring 78 is wound around the outer periphery of the pin shaft 771 of the sliding pin 77 between the pin head 772 and a pin attachment member 79. When the sliding pin 77 is pressed down by an external force, the coil spring 78 is compressed and has a restoring force against the external force.

Another type of elastic member, instead of the coil spring 78, may be used that is compressed and has a restoring force against an external force when the sliding pin 77 is pressed down by the external force.

The sliding pin 77 and the coil spring 78 are attached to the beam part 441 with the pin attachment member 79.

Specifically, the pin attachment member 79 has a shaft insertion hole 791 into which the pin shaft 771 is inserted. The shaft insertion hole 791 has an inner diameter larger than the outer diameter of the pin shaft 771 and smaller than the outer diameters of the pin head 772 and the flange 773, to prevent the pin shaft 771 inserted in the shaft insertion hole 791 from falling off.

One end of the coil spring 78 wound around the outer periphery of the pin shaft 771 engages with the top surface of the pin attachment member 79, and the other end of the coil spring 78 touches and engages with the bottom surface of the pin head 772. When the sliding pin 77 is pressed down by an external force, the coil spring 78 is compressed between the top surface of the pin attachment member 79 and the bottom surface of the pin head 772.

The pin attachment member 79 has screw holes 792. The pin attachment member 79 is fixed to the beam part 441 with screws inserted into the screw holes 792. The sliding pin 77, whose pin shaft 771 is inserted in the shaft insertion hole 791, and the coil spring 78 wound around the outer periphery of the pin shaft 771 are thus installed on the beam part 441.

Figure 7A:
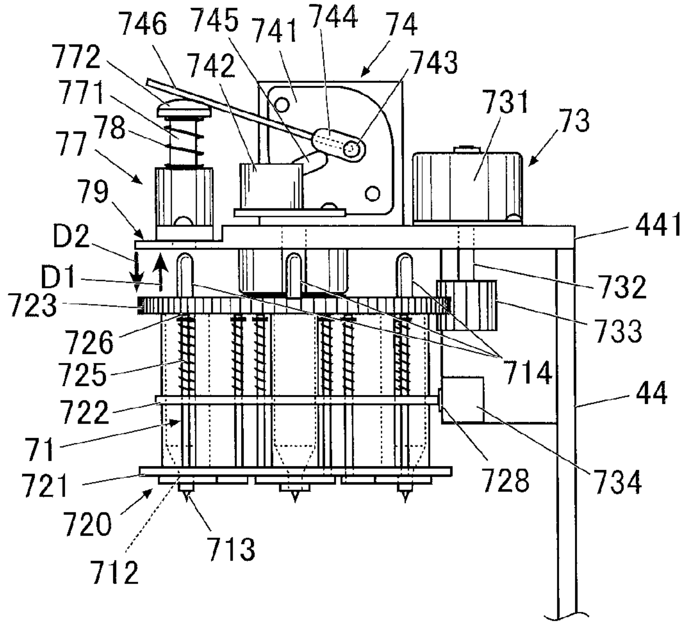
FIG. 7A is a side view of the pen carriage and pens held by the pen carriage at a non-drawing time.
Figure 7B:
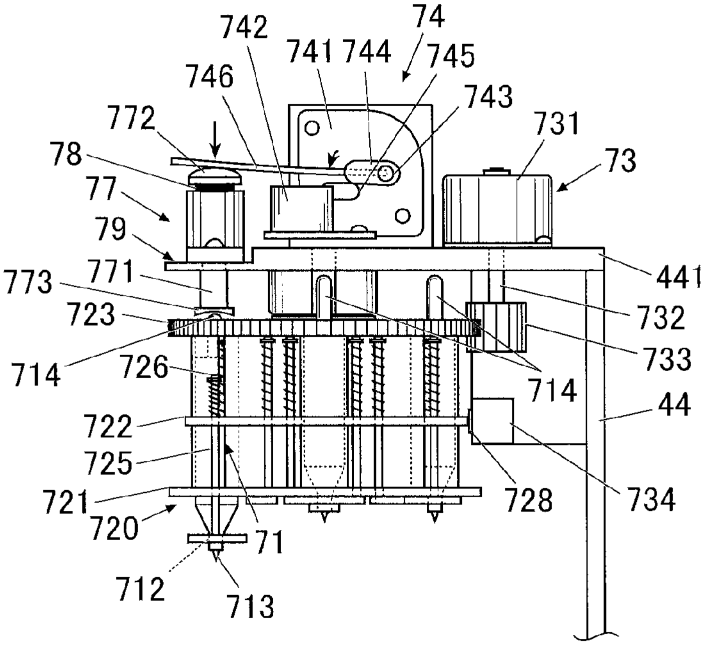
FIG. 7B is a side view of the pen carriage and pens held by the pen carriage with one of the pens being pressed down.

FIG. 7A shows a state of the pen pressing mechanism 74 at a non-drawing time, and FIG. 7B shows a state of the pen pressing mechanism 74 at a time of initialization (with the pen 71 being at a lowest point).

At a non-drawing time, as shown in FIG. 7A, where the flange 773 is separated from the top of a pen 71, the number of steps (counter) of the motor 741 is "0", in which state the plate spring 746 applies no external force to the sliding pin 77. With no external force (i.e., no pressing force from the plate spring 746), a pen 71 is pushed upward (i.e., in the upper direction in FIGS. 4A and 4B) by a biasing force of the coil springs 726, and the pen tip 713 is separated from the surface of a nail T (i.e., drawing target surface) and is kept at a height not to touch the surface of the nail T.

At the time of initialization, as shown in FIG. 7B, the motor 741 is rotated counterclockwise in FIG. 7B to press down a pen 71 to the lowest point using the plate spring 746, with no finger under the pen 71.

When the plate spring 746 deforms to apply a predetermined pen pressure to a pen 71, the lever 745 is pressed down to turn on the micro switch 742. The number of steps of the motor 741 for turning on the micro switch 742 is set to a predetermined value (e.g., "25").

In this embodiment, the spring constant of the plate spring 746 is larger than the spring constants of the coil springs 726 and the coil spring 78. Accordingly, only a little deformation of the plate spring 746 can press a pen 71 to the lowest point with no nail T under the pen 71 as shown in FIG. 7B, and can provide a predetermined pen pressure.

The relationship between the height of a nail T and the number of steps of the motor 741 is obtained in advance through various experiments and simulations. An example of the relationship is shown in TABLE 1.

TABLE 1

| LEVEL OF NAIL (mm) | NUMBER OF STEPS |
|---|---|
| TOP DEAD CENTER | 0 |
| 0.0 | 5 |
| −0.5 | 6 |
| −1.0 | 7 |
| −9.0 | 23 |
| −9.5 | 24 |
| −10.0 | 25 |

The height of a nail T is measured by nail recognition. The height of the highest part of a nail T is defined as "0.0 mm" when a finger is inserted in the finger fixation section 30 properly. The height is expressed by a negative value for a nail T fixed at a lower position or for an end part of a nail T in the width direction.

Given the height of a nail T is "0.0 mm", the number of steps of the motor 741 of "0" to "2 or 3" does not allow the pen tip 713 to touch the nail T, the number of steps of "3 to 4" allows the pen tip 713 to touch the nail T at the height of "0.0 mm", the number of steps of "4 to 5" allows the pen tip 713 to touch the nail T and to apply a predetermined pen pressure to the nail T, for example.

Then, when the height of the nail T is "−0.5 mm", the number of steps is determined to be "6" so that the pen tip 713 applies substantially the same pen pressure as when the height of the nail T is "0.0 mm".

In this way, the number of steps is changed by "1" for each decrease in height of the nail T by "0.5 mm". A pen tip 713 thus applies a substantially constant pen pressure to a nail T at any height.

The relationship between the height of a nail and the number of steps varies depending on the type or size of the pen. Different tables or correction values may be prepared depending on the type or size of the pen.

FIG. 8 shows a state in which a pen tip 713 is in contact with and applies a predetermined pen pressure to the nail T of a printing finger U1 inserted in the finger receiving section 31.

Nail information, which is described later, is obtained in advance as a preparatory stage before the state shown in FIG. 8.

The height of the position to be touched by a pen tip 713 on the nail T is recognized on the basis of the nail information, and the number of steps of the motor 741 is determined according to the recognized height.

The motor 741 is driven at the determined number of steps to press down the pen 71 with the plate spring 746, so that the pen tip 713 comes into contact with the surface of the nail T and applies a proper pen pressure to the surface of the nail T.

The number of steps of the motor 741 is increased or decreased in accordance with a change in height of the nail T during drawing to adjust the pen pressure, so that the drawing is performed with a substantially constant pen pressure.

The adjustment of the pen pressure through increase and decrease of the number of steps of the motor 741 is made each time the height of the nail T changes by a predetermined distance (e.g., 0.5 mm). That is, the adjustment of the pen pressure is not made when the change in height of the nail T is less than the predetermined distance. Such a configuration does not compromise the certainty of stable contact between the pen 71 and the nail T and of maintenance of the pen pressure at a moderate value because the plate spring 746 deforms (elastically deforms) in accordance with the shape of nail T and allows the pen 71 to move up and down automatically in accordance with the shape of the nail T.

The spring constant of the plate spring 746 is set to not so large a value, that is, the plate spring 746 is set to such a value that a user does not feel a pain when a pressing force (external force) from the plate spring 746 is applied to a nail T. Such a configuration gives no pain in a nail T at a time of drawing.

The plate spring 746, which deforms moderately, absorbs a shock due to the up-and-down motion of a pen 71 and can give a substantially constant moderate pen pressure to a pen tip 713, achieving beautiful drawings.

The unit support member 44 is fixed to an X-direction movement section 451 attached to the X-direction movement stage 45. The X-direction movement motor 46 drives the X-direction movement section 451 to move in the X direction along a guide (not shown) on the X-direction movement stage 45. This allows the drawing head 70, which is attached to the unit support member 44, to move in the X direction (i.e., the X direction in FIG. 1 or the right-left direction of the nail printing apparatus 1).

The X-direction movement stage 45 is fixed to a Y-direction movement section 471 of the Y-direction movement stage 47. The Y-direction movement motor 48 drives the Y-direction movement section 471 to move in the Y direction along a guide (not shown) on the Y-direction movement stage 47. This allows the drawing head 70, which is attached to the unit support member 44, to move in the Y direction (i.e., the Y direction in FIG. 2 or the front-back direction of the nail printing apparatus 1).

In this embodiment, the X-direction movement stage 45 and the Y-direction movement stage 47 are constituted of the combination of the X-direction movement motor 46, the Y-direction movement motor 48, ball screws (not shown), and guides (not shown).

In this embodiment, the X-direction movement motor 46, the Y-direction movement motor 48 and the like constitute a head drive section 49 as an X-Y drive section to drive the drawing head 70 including the pens 71 for drawing on nails T in the X and Y directions.

The motor 741 to move a pen 71 up and down, the motor 731 to rotate the pen carriage 72, the X-direction movement motor 46, and the Y-direction movement motor 48 of the drawing unit 7 are connected to a drawing controller 815 of a control device 80 (see FIG. 9, described later) to be controlled by the drawing controller 815.

As shown in FIGS. 1 and 2, the photographing unit 50 is disposed on the upper machine casing 12.

A substrate 13 is disposed on the upper machine casing 12, and two cameras 51 as photographing devices of the photographing unit 50 are disposed at the center of the lower surface of the substrate 13.

The cameras 51 are preferably compact cameras each including a solid image sensing element having about two million pixels or more and a lens.

The cameras 51 photograph the nail T of a printing finger U1 inserted in the finger receiving section 31 to obtain finger images, which are the images of the nail T of the printing finger U1.

In this embodiment, the two cameras 51 are arranged substantially side by side in the width direction of the nail T of a printing finger U1 inserted in the finger receiving section 31.

One of the two cameras 51 faces the bottom face of the finger receiving section 31 to photograph a nail T from just above. The other of the two cameras 51 is slightly tilted to the bottom face of the finger receiving section 31 to photograph the nail T from diagonally above.

The substrate 13 is provided with illuminators (illuminating devices) 52, such as white LEDs, disposed in such a way as to surround the cameras 51. The illuminators 52 illuminate the nail T of a printing finger U1 at the time of the photographing by the cameras 51. The photographing unit 50 is constituted of the cameras 51 and the illuminators 52.

The photographing unit 50 is connected to a photographing controller 811 of a control device 80 (see FIG. 9, described later) to be controlled by the photographing controller 811.

The image data of images obtained by the photographing unit 50 is stored in a nail image storage area 821 of a storage unit 82, described later.

In this embodiment, two cameras 51 as photographing devices photograph a nail T from at least two different positions or angles to obtain at least two finger images.

A nail information detector 812 (described later) detects nail information, such as the contour (shape), the horizontal position, the curved shape, and the vertical position (height) of a nail T, on the basis of the finger images.

The nail information detector 812 can detect the inclination angle of the surface of a nail T to the X-Y plane (hereinafter referred to as "inclination angle of a nail T" or "nail curvature"), on the basis of the finger images.

Taking the images of a nail T from just above and from diagonally above the nail T enables accurate detection of the inclination angle of the surface of the nail T as well as the contour of the nail T.

The nail information detected by the nail information detector 812 is not limited to the examples listed above. Only a part of the above-listed items (e.g., the contour of nail T) or additional items other than those listed above may be detected as nail information.

The control device 80 is disposed, for example, on the substrate 13 on the upper machine casing 12.

Figure 9:
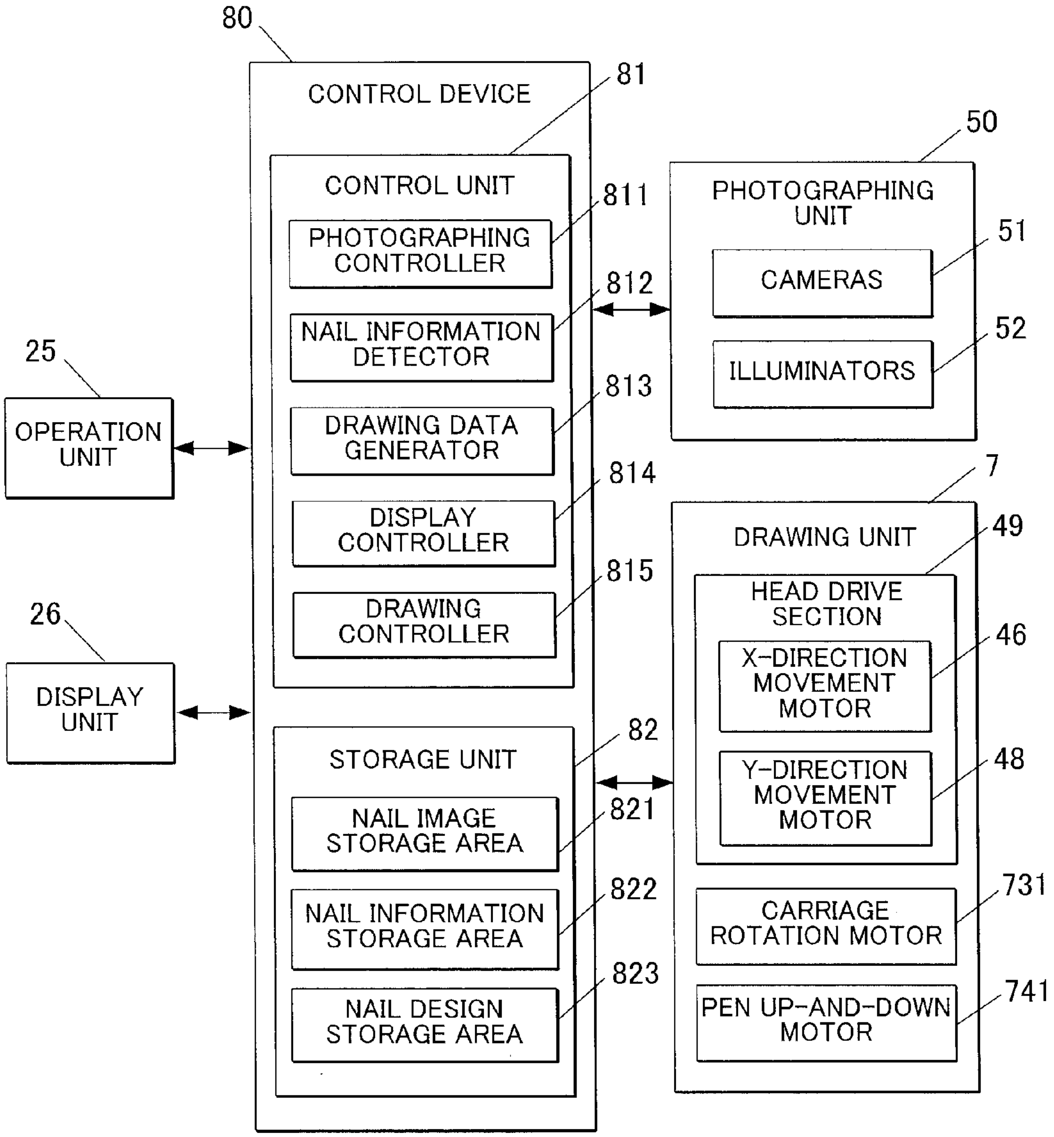
FIG. 9 is a block diagram showing the principal control configuration of the nail printing apparatus according to this embodiment.

FIG. 9 is a block diagram showing the principal control configuration in this embodiment.

As shown in FIG. 9, the control device 80 is a computer including a control unit 81 constituted of a central processing unit (CPU), and a storage unit 82 constituted of a read only memory (ROM) and a random access memory (RAM), for example.

The storage unit 82 contains various programs and various pieces of data for the operation of the nail printing apparatus 1.

Specifically, the ROM of the storage unit 82 contains various programs, such as a nail information detection program to detect nail information, such as the shape and contour of a nail T, from finger images; a drawing data generation program to generate drawing data; and a drawing program to perform drawing processing. Each unit of the nail printing apparatus 1 is comprehensively controlled through the execution of these programs by the control device 80.

In this embodiment, the storage unit 82 includes a nail image storage area 821, a nail information storage area 822, and a nail design storage area 823. The nail image storage area 821 stores finger images of the nail T of a user's printing finger U1 obtained by the photographing unit 50. The nail information storage area 822 stores the nail information (including the contours and inclination angles of nails T) detected by the nail information detector 812. The nail design storage area 823 stores the image data of nail designs to be drawn on nails T.

The control unit 81 includes the photographing controller 811, the nail information detector 812, the drawing data generator 813, the display controller 814, and the drawing controller 815, in terms of its function. The functions as the photographing controller 811, the nail information detector 812, the drawing data generator 813, the display controller 814, and the drawing controller 815 are carried out through cooperation between the CPU of the control unit 81 and the programs stored in the ROM of the storage unit 82.

The photographing controller 811 controls the cameras 51 and the illuminators 52 of the photographing unit 50 so that the cameras 51 take finger images each including the image of the nail T of a printing finger U1 inserted in the finger receiving section 31.

In this embodiment, the photographing controller 811 allows the two cameras 51 to obtain at least two finger images from different positions or angles (e.g., from just above a nail T and diagonally above the nail T).

The image data of finger images obtained by the photographing unit 50 may be stored in the storage unit 82.

The nail information detector 812 detects the nail information on the nail T of a printing finger U1 on the basis of the images of the nail T of the printing finger U1 inserted in the finger receiving section 31 obtained by the cameras 51.

The nail information includes the information on the contour of a nail T (i.e., the shape or the horizontal position of a nail T), the distribution of height of a nail T (i.e., the position of a nail T in the vertical direction, hereinafter referred to as "vertical position of a nail T" or simply as "the position of a nail T") in the contour of the nail T, and the distribution inclination angle of the surface of a nail T to the X-Y plane (i.e., the inclination angle of a nail T or nail curvature) in the contour of the nail T.

Specifically, the nail information detector 812 detects the contour (shape and size) and position of the nail T from the finger images of a printing finger U1 obtained by the cameras 51. Thus, the contour is acquired as the information represented by x-y coordinates, for example.

For example, the nail information detector 812 detects the contour (shape) of a nail T on the basis of the difference in color between the nail T and the other part of the finger, from the finger images of the printing finger U1 obtained by the cameras 51.

The method to detect the contour (shape) of a nail T is not limited to the example shown here, but the nail information detector 812 may use any other method.

The nail information detector 812 detects the inclination angle of a nail T (nail curvature) on the basis of at least two finger images obtained by the two cameras 51.

The nail information detector 812 detects the distribution of inclination angle (curvature) in the contour of a user's nail T on the basis of the difference in position and shape appearing in the two finger images taken by the two cameras 51 from different positions or angles (e.g., from just above and diagonally above the nail T). The method to detect the inclination angle of a nail T (nail curvature) is not limited to the example shown here, but the nail information detector 812 may use any other method.

For example, a camera that is attached to the pen carriage 72 to be movable may be provided. In this case, the camera can be moved with the pen carriage 72 to take finger images at two different positions, and thus only one camera is enough.

The drawing data generator 813 generates drawing data to be applied to the nail T of a printing finger U1 by the drawing head 70 on the basis of the nail information detected by the nail information detector 812.

Specifically, the drawing data generator 813 performs a fitting process such as expansion or reduction in size or clipping of the image data of a nail design on the basis of the shape of a nail T detected by the nail information detector 812. The drawing data generator 813 thus generates the data to be drawn on a nail T.

In this embodiment, the drawing data generator 813 fits image data of a nail design to the shape of a nail T and performs curved surface correction as appropriate in accordance with the nail information detected by the nail information detector 812.

The drawing data of a nail design is thus generated.

The display controller 814 controls the display unit 26 to display various screens on the display unit 26. In this embodiment, the display controller 814 controls the display unit 26 to display a selection screen to allow selection of a nail design, a thumbnail image for confirmation of a design, finger images obtained by the photographing of a printing finger U1, and various instruction screens.

The drawing controller 815 outputs control signals based on drawing data generated by the drawing data generator 813 to the drawing unit 7 and controls the motor 741 of the pen pressing mechanism 74, the motor 731, the X-direction movement motor 46, and the Y-direction movement motor 48 of the drawing unit 7 to make a drawing based on the drawing data on a nail T.

In this embodiment, the drawing controller 815 controls the motor 741 in such a way that the number of steps of the motor 741 is "0" at a non-drawing time.

At a drawing time, on the other hand, the drawing controller 815 controls the motor 741 in such a way that the number of steps corresponds to a detected height of a nail T. In other words, the drawing controller 815 is a motor controller according to the present invention.

Accordingly, at a non-drawing time, the plate spring 746 does not press down the pin head 772 of the sliding pin 77, the support rods 725 are biased upward D1 by the coil springs 726, and a pen 71 is in an upper position where the pen tip 713 does not touch a nail T.

At a drawing time, on the other hand, the plate spring 746 presses down the pin head 772 of the sliding pin 77, a pen 71 is pressed down against the biasing force of the coil springs 726, and the pen 71 is in a lower position where the pen tip 713 touches a nail T.

The drawing controller 815 thus controls the operation of the motor 741 to move a pen 71 up and down as appropriate and allows the pen tip 713 to move up and down in accordance with the height of a nail T while keeping a moderate pen pressure. Such a configuration enables a desired nail design to be drawn on the surface of a nail T or a drawing target surface.

The operation of and how to use the nail printing apparatus 1 in this embodiment will now be described.

In performing drawing with the nail printing apparatus 1, a user first operates the electrical power switch button to start the control device 80.

The display controller 814 controls the display unit 26 to display the design selection screen. The user operates an operation button of the operation unit 25 and selects a desired nail design among a plurality of nail designs displayed on the design selection screen. This causes the operation unit 25 to output a selection instruction signal so that a nail design to be drawn on a nail T is selected.

Upon selection of a nail design, the control unit 81 allows the display unit 26 to display an instruction screen urging a user to attach pens 71 required for drawing the selected nail design to predetermined pen cylindrical members 761 of the drawing head 70.

When red ink and gold ink containing glitter are needed, for example, the control unit 81 gives instructions through the display unit 26 about which pens 71 are to be attached to which pen cylindrical members 761. A user attaches the specified types of pens 71 to the specified pen cylindrical members 761 in accordance with the instructions displayed on the screen. A user may dare to attach pens 71 different from the instructions to produce a nail design with desired colors and texture.

The information on which pens 71 are held by the pen carriage 72 may be read by the control unit 81 using a bar code, for example. In this case, nail designs which can be created with the pens 71 held by the pen carriage 72 may be displayed on the design selection screen of the display unit 26 so that a user can select one of the nail designs.

Next, the user inserts a printing finger U1 in the finger receiving section 31 and inserts non-printing fingers U2 in the finger escape section 32 so as to fix the printing finger U1. The user then operates the drawing start button.

For example, when the left ring finger is inserted in the finger receiving section 31 as a printing finger U1, the other fingers are inserted in the finger escape section 32 as non-printing fingers U2.

Before the start of a drawing operation, the photographing controller 811 controls the photographing unit 50 so that the two cameras 51 photograph the printing finger U1 while the illuminators 52 illuminate the printing finger U1 in response to an instruction input from the drawing start button. The photographing controller 811 thus obtains at least two finger images of the printing finger U1 inserted in the finger receiving section 31.

Next, the nail information detector 812 detects nail information, such as the contour (shape) of the nail T and the distribution of the height and inclination angle (curvature) of the nail T in the contour of the nail T on the basis of the finger images.

After the nail information detector 812 detects the contour (shape) and inclination angle (curvature) of the nail T as the nail information, the drawing data generator 813 performs the fitting process to fit the image data of the nail design to the nail T on the basis of the nail information.

The drawing data generator 813 then performs the curved surface correction on the image data of the nail design on the basis of the nail information. Thus, drawing data is generated.

Before the start of drawing on the nail T, the drawing controller 815 moves the drawing unit 7 to the position above the pen warm-up section 61. The drawing controller 815 drives the motor 741 of the pen pressing mechanism 74 of the pen carriage 72 holding pens 71 to carry a pen 71 down with the plate spring 746 so that the pen 71 is ready for drawing. Predetermined figures, such as "○" and "∞", are then drawn on a drawing medium for warm-up and conditioning of the pens 71. The warm-up drawing may be performed by only the pens 71 required to draw a selected nail design or alternatively may be performed by all the pens 71.

After the drawing data has been generated and the warm-up drawing has been completed, the drawing controller 815 outputs control signals based on the drawing data to the drawing unit 7 and allows the drawing head 70 to perform drawing based on the drawing data.

Specifically, the drawing controller 815 obtains the degree of rotation of the pen carriage 72 from the results of reading of the reference mark 728 by the mark reader 734 and controls the driving of the motor 731 in accordance with the degree of rotation of the pen carriage 72. The drawing controller 815 thereby rotates the pen carriage 72 so that the pen 71 required for the drawing comes to the position of the pen pressing mechanism 74.

The drawing controller 815 further moves the drawing head 70 in the X and Y directions as appropriate to a drawing position.

The drawing controller 815 recognizes the height of the position to be touched by a pen tip 713 on the nail T on the basis of the distribution of the height of the nail T in the contour of the nail T in the nail information and drives the motor 741 by the number of steps according to the recognized height.

The pen pressing mechanism 74 accordingly operates to press down the support rods 725 with the plate spring 746.

This operation carries the pen 71 down to allow the pen tip 713 of the pen 71 to be pressed against the surface of the nail T. At this time, the pen tip 713 is biased downward at a moderate pressure by the plate spring 746, enabling the pen 71 to freely move up and down along the surface shape of the nail T for drawing.

For performing drawing on the nails T of a plurality of fingers, a finger with the nail T for which drawing has completed is pulled out of the finger receiving section 31 and a finger with a next drawing target nail T is inserted in the finger receiving section 31 as a printing finger U1. The finger images of the nail T are then obtained. These processes are then repeated.

When a pen 71 is to be replaced, the drawing controller 815 moves the drawing head 70 to a position corresponding to the cover 23 for pen replacement. A user then opens the cover 23 for pen replacement to remove and replace the pen 71.

As described above, according to this embodiment, one motor 741 operates the plate spring 746, and the degree of rotation of the motor 741 is controlled in accordance with the height of a position, touched by the pen tip 713 of a pen 71, on the surface of a nail T. Accordingly, the pen 71 performs drawing on the surface of the nail T with its tip 713 having a predetermined pen pressure and freely moving up and down along the surface shape of the nail T. Thus one drive source can move a pen 71 up and down in accordance with the nail surface shape, and can provide a substantially constant and moderate pen pressure regardless of the surface shape of the nail T.

The motor 741, which is used as a drive source in this embodiment, can make a larger up-and-down motion of a pen 71 than in a case in which a solenoid is used as a drive source.

Since the height of a touch position is recognized based on the surface of the nail T detected from finger images, the motor 741 can be appropriately controlled in accordance with the actual shape of the nail T.

It should be understood that the present invention is not limited to the above-described embodiment but may be modified as appropriate without departing from the spirit of the invention.

For example, although the configuration of the present invention is applied to the plotter nail printing apparatus 1 in the above-described embodiment, the present invention may also be applied to a hybrid nail printing apparatus using both inkjet and plotter systems.

Figure 10A:
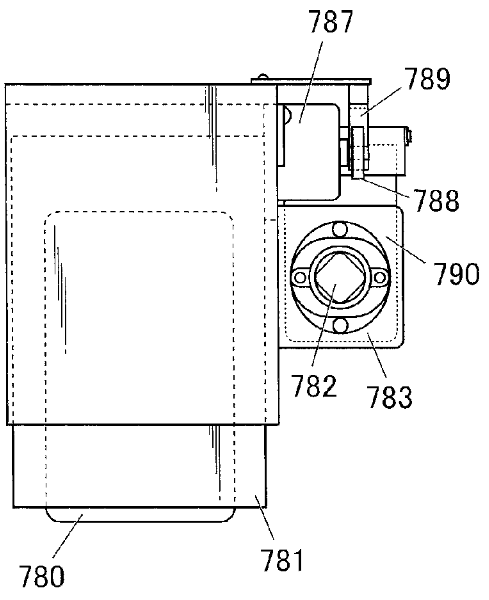
FIGS. 10A and 10B show a modification of the drawing head, FIG. 10A being a top view and FIG. 10B being a side view.
Figure 10B:
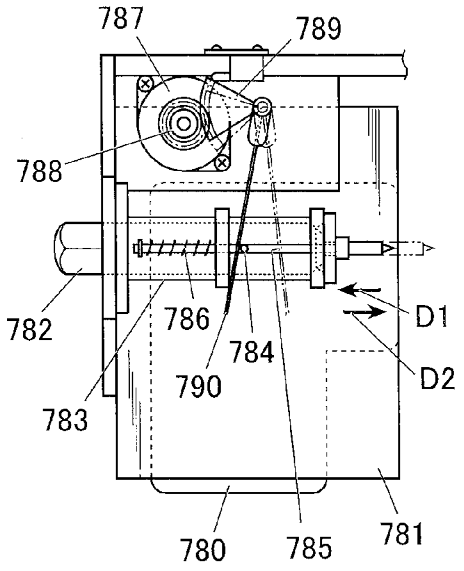

FIGS. 10A and 10B show a modification of a drawing head, FIG. 10A being a top view, and FIG. 10B being a side view.

As shown in FIGS. 10A and 10B, a drawing head 70A includes an ink holder 781, which holds an ink cartridge 780, and a pen holder (drawing tool holder) 783, which holds a pen 782. The ink holder 781 and the pen holder 783 are adjacent to each other. The pen holder 783 has an auxiliary member 785 which is fixed to the pen 782 with, for example, screws and moves upward D1 and downward D2 along with the pen 782. The auxiliary member 785 has a protrusion 784 protruding in a direction away from the shaft center of the pen 782.

The pen holder 783 has a coil spring 786 to bias the auxiliary member 785 upward D1. A pen up-and-down mechanism allows a plate spring 790, which engages with the protrusion 784, to directly press down the protrusion 784 provided on the auxiliary member 785, to carry the pen 782 downward D2. Such a pen up-and-down mechanism allows the pen 782 to be replaced easily. Further, the pen up-and-down mechanism can be low in height.

A motor 787, a gear 789, and the plate spring 790 are provided near the pen holder 783. The motor 787 is constituted of a step motor. The gear 789 engages with a gear 788 attached to the rotation shaft of the motor 787. The plate spring 790 rotates with the rotation of the gear 789. The plate spring 790, which engages with the protrusion 784, can press down the pen 782.

When the plate spring 790 rotated with the rotation of the motor 787 engages with the protrusion 784 and presses down the protrusion 784, the pen 782 is pressed down against the biasing force of the coil spring 786.

This configuration allows a drawing controller 815 to control the operation of the motor 787 to move the pen 782 up and down as appropriate. Accordingly, the pen 782 can move up and down in accordance with the height of a nail T while keeping a moderate pen pressure and thus can draw a desired nail design on the surface of the nail T or drawing target surface.

In the above-described embodiment, a step motor with a gearhead is used as the motor 741 to rotate the plate spring 746. Alternatively, a step motor without a gearhead may be used if a gear is separately provided.

A step motor capable of performing half-step drive or a step motor having a smaller step angle may be used instead.

Further, a servomotor or a DC motor may also be used instead of a step motor. In such a case, a rotary encoder to detect the rotation angle of the motor is preferably employed.

Although some embodiments of the present invention have been described, the invention is not limited to the embodiments shown but covers the scope of the claims and its equivalents.

What is claimed is:

1. A drawing apparatus comprising:

a drawing tool holder which holds a drawing tool in such a way that the drawing tool is movable toward a drawing target surface and away from the drawing target surface, the drawing tool touching the drawing target surface to perform drawing on the drawing target surface, wherein the drawing target surface is a surface of a nail of a finger or toe, where the surface of the nail has a curved shape along one direction; and a drawing tool pressing mechanism which presses the drawing tool, held by the drawing tool holder, with a pressing force toward the drawing target surface when the drawing tool performs the drawing on the drawing target surface, wherein the drawing tool pressing mechanism changes the pressing force in accordance with a change in height of a position to be touched by the drawing tool on the drawing target surface according to the curved shape due to a change in position where the drawing tool touches the drawing target surface, in such a way as to reduce a change in pressure which the drawing tool applies to the drawing target surface by touching the drawing target surface.

2. The drawing apparatus according to claim 1, further comprising an information detector to detect a distribution of the height of the drawing target surface on the basis of an image obtained by photographing the drawing target surface, wherein the drawing tool pressing mechanism changes the pressing force on the basis of the distribution of the height of the drawing target surface detected by the information detector.

3. The drawing apparatus according to claim 1, wherein the drawing tool holder includes a biasing member to bias the drawing tool away from the drawing target surface; and the drawing tool pressing mechanism presses the drawing tool against a biasing force of the biasing member.

4. The drawing apparatus according to claim 1, further comprising an ink-jet print head to perform the drawing on the drawing target surface.

5. The drawing apparatus according to claim 1, wherein the drawing tool pressing mechanism includes:

a press member;

a drive mechanism to rotate the press member to press the drawing tool toward the drawing target surface; and a drive mechanism controller to control an angle by which the drive mechanism rotates the press member, to change the pressing force in accordance with the height of the position to be touched by the drawing tool on the drawing target surface.

6. The drawing apparatus according to claim 5, wherein the drive mechanism controller controls the angle by which the drive mechanism rotates the press member in accordance with the change in the height of the position to be touched by the drawing tool on the drawing target surface, in such a way as to reduce the change in the pressure which the drawing tool applies to the drawing target surface by touching the drawing target surface.

7. The drawing apparatus according to claim 5, wherein the press member is an elastic member which is elastically deformable.

8. The drawing apparatus according to claim 5, wherein the drawing tool has a first end to touch the drawing target surface to perform the drawing, and a second end opposite to the first end; and the drive mechanism allows the press member to touch the second end of the drawing tool to press the drawing tool.

9. The drawing apparatus according to claim 5, wherein the drawing tool holder includes an auxiliary member to which the drawing tool is fixed, the auxiliary member being movable toward the drawing target surface and away from the drawing target surface with the drawing tool; and the drive mechanism allows the press member to touch the auxiliary member to press the drawing tool.

10. The drawing apparatus according to claim 5, wherein the drive mechanism controller controls the drive mechanism in such a way that the angle by which the drive mechanism rotates the press member is smaller as the height of the position to be touched by the drawing tool on the drawing target surface is higher.

11. The drawing apparatus according to claim 5, wherein the drive mechanism includes a motor to rotate the press member; and the drive mechanism controller controls a degree of rotation of the motor.

12. The drawing apparatus according to claim 5, further comprising an information detector to detect a distribution of the height of the drawing target surface on the basis of an image obtained by photographing the drawing target surface, wherein the drive mechanism controller controls the angle by which the drive mechanism rotates the press member on the basis of the distribution of the height of the drawing target surface detected by the information detector.

13. A control method of a drawing apparatus including a drawing tool holder which holds a drawing tool in such a way that the drawing tool is movable toward a drawing target surface and away from the drawing target surface, the drawing tool touching the drawing target surface to perform drawing on the drawing target surface, wherein the drawing target surface is a surface of a nail of a finger or toe, where the surface of the nail has a curved shape along one direction and a drawing tool pressing mechanism which presses the drawing tool, held by the drawing tool holder, with a pressing force toward the drawing target surface when the drawing tool performs the drawing on the drawing target surface, the method comprising the steps of:

pressing, using the drawing tool pressing mechanism, the drawing tool held by the drawing tool holder toward the drawing target surface when the drawing tool performs the drawing on the drawing target surface; and changing, using the drawing tool pressing mechanism, the pressing force in accordance with a change in height of a position to be touched by the drawing tool on the drawing target surface according to the curved shape due to a change in position where the drawing tool touches the drawing target surface, in such a way as to reduce a change in pressure which the drawing tool applies to the drawing target surface by touching the drawing target surface.

14. The control method of the drawing apparatus according to claim 13, further comprising the step of detecting a distribution of the height of the drawing target surface on the basis of an image obtained by photographing the drawing target surface, wherein the step of changing the pressing force includes the step of changing the pressing force on the basis of the detected distribution of the height of the drawing target surface.

15. The control method of the drawing apparatus according to claim 13, wherein the drawing tool pressing mechanism includes a press member and a drive mechanism which rotates the press member to press the drawing tool toward the drawing target surface; and the step of changing the pressing force includes the step of changing the pressing force by controlling an angle by which the drive mechanism rotates the press member in accordance with the height of the position to be touched by the drawing tool on the drawing target surface.

* * * * *